(12) United States Patent
Huang

(10) Patent No.: US 7,632,024 B2
(45) Date of Patent: Dec. 15, 2009

(54) RETRACTABLE LENS AND SWINGABLE LENS RETRACTING DEVICE THEREOF

(75) Inventor: Chun-hung Huang, Changhwa (TW)

(73) Assignee: Asia Optical Co., Inc., Taichung (TW)

( * ) Notice: Subject to any disclaimer, the term of this patent is extended or adjusted under 35 U.S.C. 154(b) by 409 days.

(21) Appl. No.: 11/462,614

(22) Filed: Aug. 4, 2006

(65) Prior Publication Data

US 2007/0047937 A1   Mar. 1, 2007

(30) Foreign Application Priority Data

Aug. 24, 2005 (TW) .............................. 94129013 A

(51) Int. Cl.
*G02B 7/02* (2006.01)
*G03B 5/02* (2006.01)
*G03B 5/06* (2006.01)

(52) U.S. Cl. ..................... 396/349; 396/350; 359/817
(58) Field of Classification Search ............. 396/73–75, 396/348–350; 359/672–675, 822
See application file for complete search history.

(56) References Cited

U.S. PATENT DOCUMENTS

| 4,397,544 | A | * | 8/1983 | Yajima et al. ................. 355/58 |
| 4,887,107 | A | * | 12/1989 | Nakamura et al. ............ 396/75 |
| 5,166,716 | A | | 11/1992 | Kawano |
| 6,978,089 | B2 | * | 12/2005 | Nomura et al. ............... 396/75 |
| 7,209,294 | B2 | * | 4/2007 | Takahashi ................... 359/672 |
| 2003/0156832 | A1 | | 8/2003 | Nomura et al. |
| 2004/0042778 | A1 | * | 3/2004 | Nomura ....................... 396/73 |
| 2005/0185297 | A1 | * | 8/2005 | Omiya et al. ............... 359/704 |

FOREIGN PATENT DOCUMENTS

JP          63172141 A  *  7/1988  ................ 396/544

* cited by examiner

*Primary Examiner*—Melissa Jan Koval
*Assistant Examiner*—Leon W Rhodes

(57) ABSTRACT

A retractable lens (1) and a swingable lens retracting device (2) thereof are provided. The retractable lens has first, second and third lens groups (L1, L2, L3) constituting a photographing optical system. The swingable lens retracting device consists of a second lens group moving frame (21) and a second lens group holding frame (22) rotatably received in the second lens group moving frame via a pivot shaft (221). A pair of torsion springs (224) is mounted on respective opposite ends of the pivot shaft. When the retractable lens is retracted back to a retracted state, the second lens group is biased by the swingable lens retracting device to an off-axis space radially outside a common optical axis of the photographing optical system with its optical axis being orthogonal to the common optical axis. The transition between a retracted position and a photographing position of the second lens group is accomplished by the resilient restoring force of the torsion springs.

13 Claims, 8 Drawing Sheets

RETRACTABLE LENS AND SWINGABLE LENS RETRACTING DEVICE THEREOF

BACKGROUND OF THE INVENTION

1. Field of the Invention

The present invention relates to a retractable lens and an optical element holding device thereof, and particularly to a retractable photographing lens and a swingable lens retracting device thereof. The swingable lens retracting device retracts a part of a plurality lens elements, constituting a photographing optical system, to a position deviating from the photographing optical axis of the photographing optical system when the photographing lens is fully retracted.

2. Description of Prior Art

Retractable photographing (imaging) lenses incorporated in optical devices, such as digital cameras, are generally zoom lenses that effect zooming by position variation of a plurality of lens groups thereof. The retractable lens completely retracts into the device body when the optical device is not in use, and extends out when in use. Accordingly, relative to a fixed zoom lens that is bulky and heavy, the retractable lens has the advantages of compactness and portability. In a conventional retractable photographing lens including a plurality of optical elements, one or more movable optical elements thereof are moved only along a common photographing optical axis. Therefore, as shown in FIG. 1 of the attached drawings, when such a retractable photographing lens is fully retracted, it is impossible to make the length of the photographing lens smaller than the sum of the thickness of all the optical elements. Accordingly, the length of the device body incorporating this retractable lens also cannot be further reduced.

To address the above problem, that is, to further minimize the retractable photographing lens, various designs, such as those disclosed in U.S. Pat. No. 5,166,716 and US Patent Application No. 20030156832, have been proposed. In these designs, when the retractable photographing lens is fully retracted, a part of the plurality of lens elements thereof is retracted to a position deviating from a common photographing optical axis of the photographing optical system. The optical axes of these deviating lens elements are arranged to be parallel to the common photographing optical axis so as to reduce the length of the device body. However, at the same time, the height of the device body may be increased to an unacceptable level for a compact optical device. Further, in these designs, the structure and driving mechanism of a lens retracting device for holding the deviating lens element are generally complicated, which results in tedious assembly and increased cost.

Accordingly, to overcome the problems present in the prior art, it is desired to provide a new optical element holding device for a retractable lens that reduces the length and height of an optical device incorporating the retractable lens, and is simple in structure and easy in assembly.

SUMMARY OF THE INVENTION

The object of the present invention is to provide a swingable lens retracting device for a retractable lens that retracts a part of the plurality of lens elements to a position deviating from a common photographing optical axis of the photographing optical system when the retractable lens is fully retracted, so as to obtain a compact retractable lens in a fully retracted state. The optical axis of the deviating lens element is arranged to be orthogonal to the common photographing optical axis Another object of the present invention is to provide a swingable lens retracting device for a retractable lens that is simple in structure and easy in assembly.

A further object of the present invention is to provide a retractable lens having a swingable lens retracting device as described as above. The retractable lens is capable of extending out and retracting back when desired, and is small in size and compact in configuration when in a fully retracted state.

To achieve the above objects of the present invention, a retractable lens in accordance with the present invention includes first, second and third lens groups constituting a photographing optical system, a swingable lens retracting device, and a CCD (Charge Coupled Device) holder. The swingable lens retracting device includes a second lens group moving frame and a second lens group holding frame rotatably received in the second lens group moving frame by means of a pivot shaft. A pair of torsion springs is mounted at respective opposite ends of the pivot shaft. In the course of retracting movement of the retractable lens to a fully retracted state, the second lens group moving frame correspondingly retracts back toward the CCD holder. Consequently, a curved surface of an engagement portion of the second lens group holding frame, which is rotatably received in the second lens group moving frame, is brought into contact with a corresponding front surface of a contact portion of the CCD holder. As a result, the second lens group holding frame is biased to rotate to an off-axis space radially outside the common photographing optical axis, whereby the optical axis of the second lens group received in the second lens group holding frame is orthogonal to the common photographing optical axis. This allows the retractable lens to be small in size and compact in configuration when in the fully retracted state. The transition between a retracted position and a photographing position of the second lens group is accomplished by the resilient restoring force of the torsion springs.

The present swingable lens retracting device for a retractable lens employs a biasing and restoring mechanism that is simple in structure, easy in assembly and convenient in operation. When the retractable lens is desired to be in a retracted state, the second lens group thereof, originally in an on-axis position, is biased via the swingable lens retracting device to an off-axis space radially outside the common photographing optical axis, with the optical axis thereof to be orthogonal to the common photographing optical axis. This allows the retractable lens to be small in size and compact in configuration when in the fully retracted state. When such a retractable lens is incorporated into a camera, the configuration of the camera can be made more compact accordingly, so as to meet the current miniaturization requirement.

BRIEF DESCRIPTION OF THE DRAWINGS

The present invention may best be understood through the following description with reference to the accompanying drawings, in which.

DETAILED DESCRIPTION OF THE PREFERRED EMBODIMENT

Figure 1:
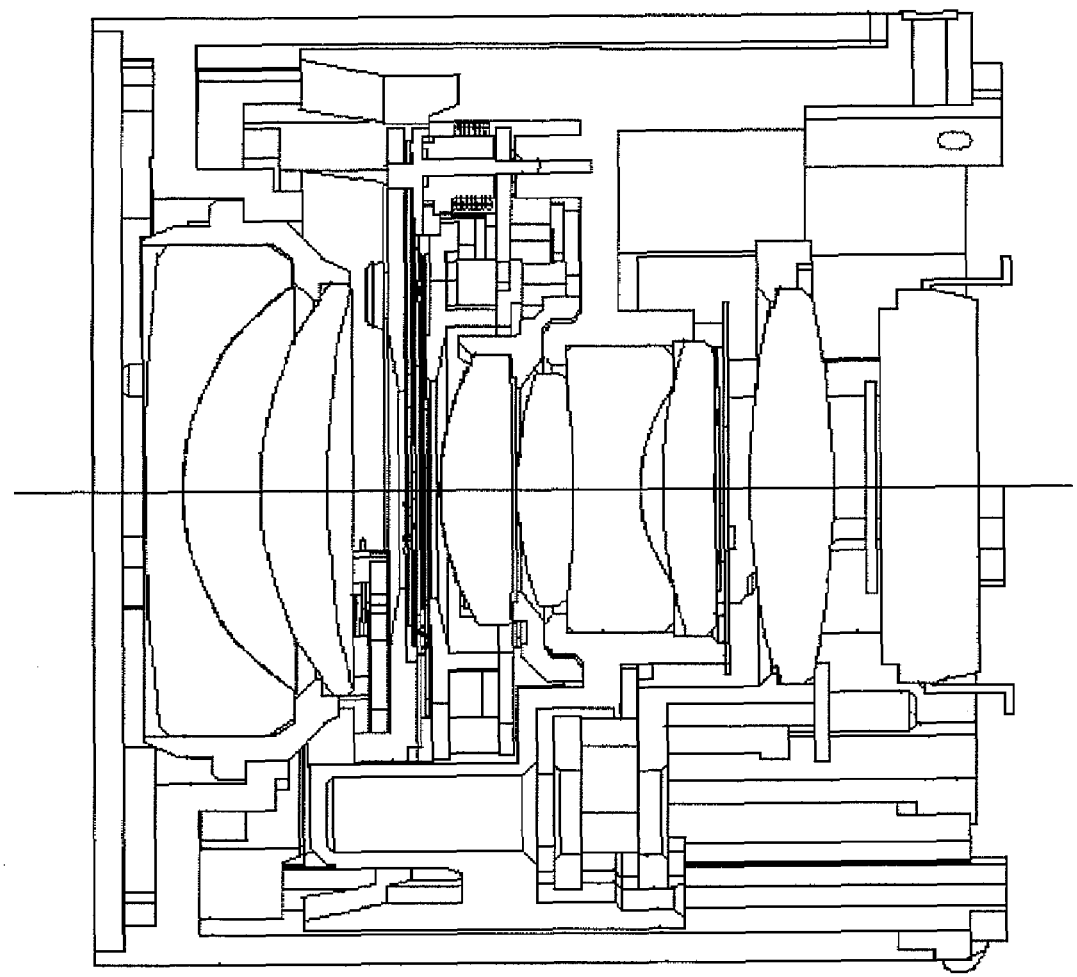
FIG. 1 is a cross-sectional view of a camera incorporating a conventional retractable lens, showing all lens groups of the conventional retractable lens are aligned on a common photographing optical axis when in a retracted state of the conventional retractable lens.
Figure 2:
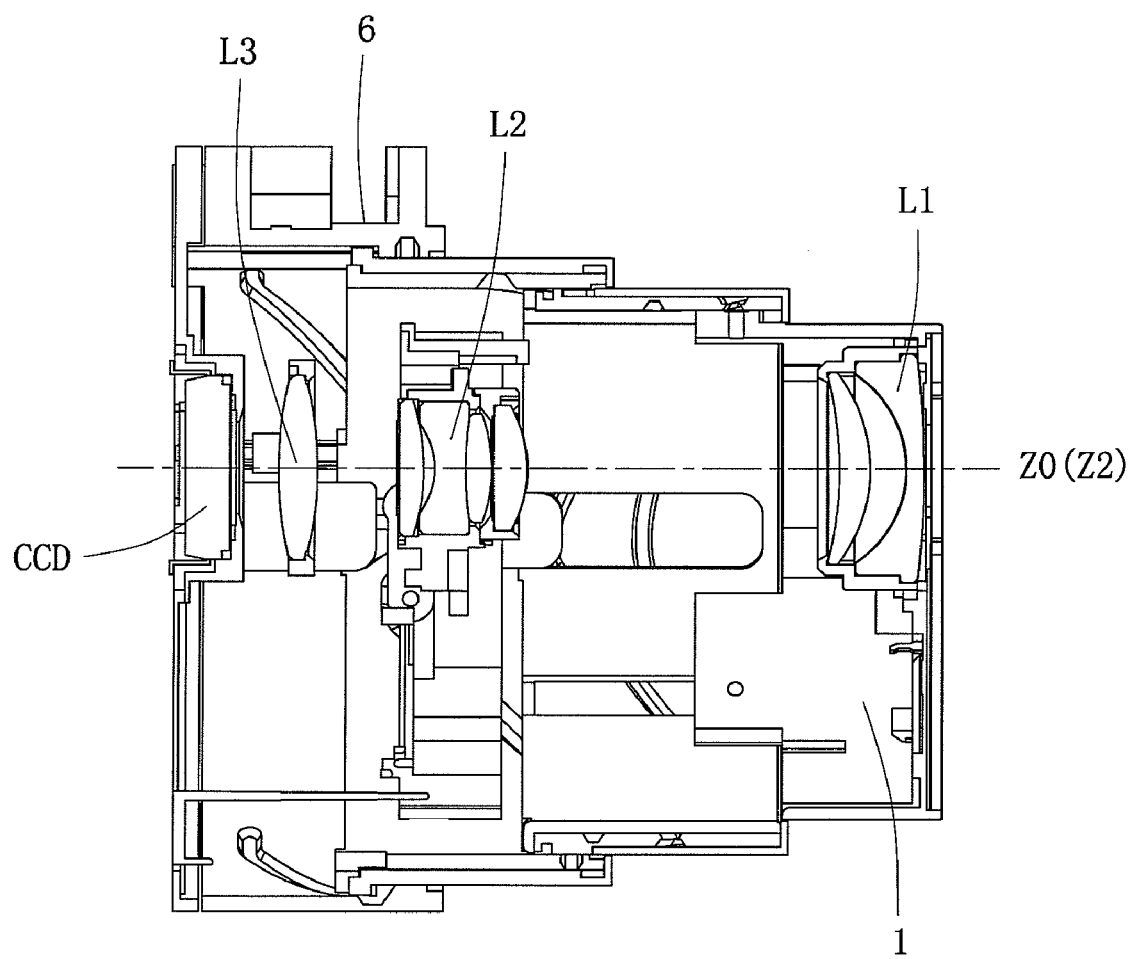
FIG. 2 is a cross-sectional view of a camera incorporating a retractable lens in accordance with the present invention, showing all lens groups of the retractable lens are aligned on a common photographing optical axis when in an outwardly extended, operational state of the retractable lens.
Figure 3:
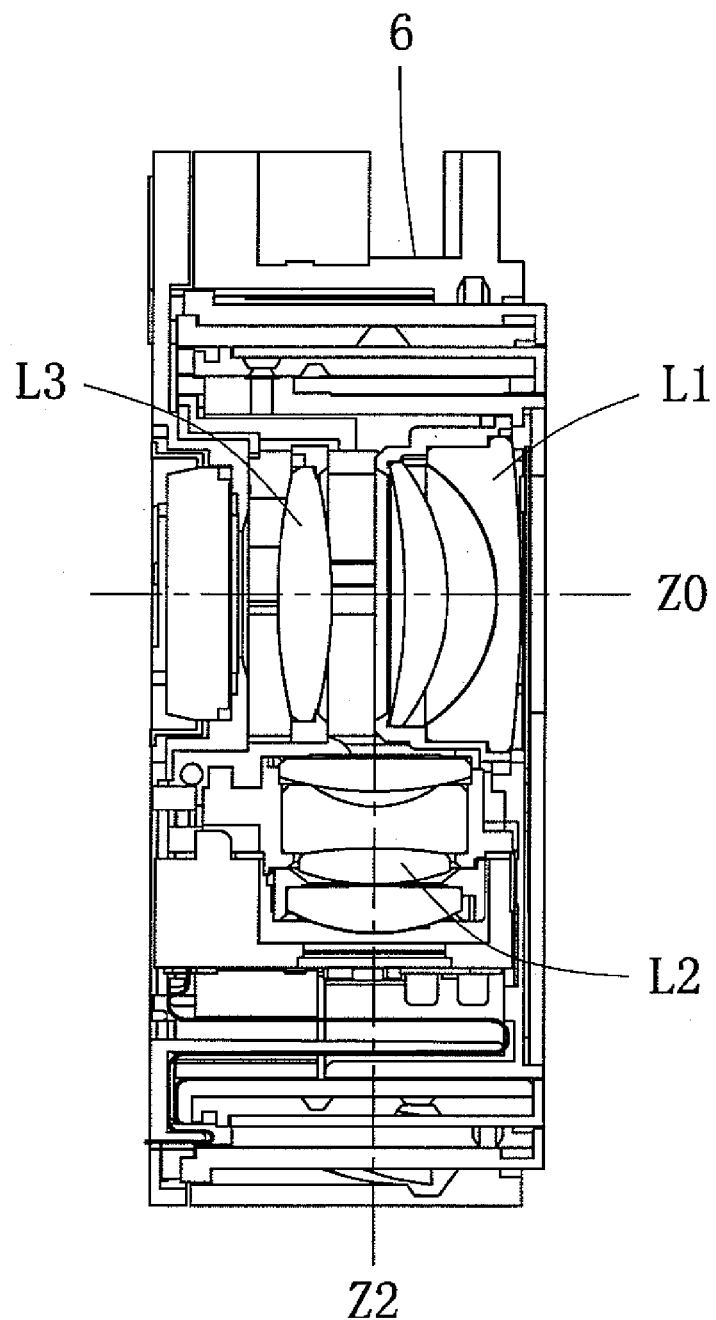
FIG. 3 is another cross-sectional view of a camera incorporating the retractable lens, showing the second lens group of the retractable lens is retracted to a position deviating from the common photographing optical axis when in a fully retracted state of the retractable lens.

With reference to the drawings, and in particular to FIG. 2, which shows a cross-sectional view of a camera incorporating a retractable lens 1 in accordance with the present invention in an outwardly extended, operational state, the retractable lens 1 comprises first, second, and third lens groups L1, L2, L3. In the operational state shown in FIG. 2, the first, second and third lens groups L1, L2, L3 of the retractable lens 1, which constitute a photographing optical system, are aligned on a common photographing optical axis Z0 of the photographing optical system. When the retractable lens 1 is in a retracted, non-operational state, as shown in FIG. 3, the second lens group L2 is retracted to an off-axis space radially outside the common photographing optical axis Z0, with its optical axis Z2 to be orthogonal to the common photographing optical axis Z0. This allows the retractable lens 1 to be small in size and compact in configuration when in the fully retracted state. When the retractable lens 1 is incorporated into a camera, the configuration of the camera can be made more compact accordingly.

The transition between an off-axis, retracted position and an on-axis, photographing position of the second lens group L2 is accomplished by the operation of a swingable lens retracting device 2 in accordance with the present invention. The operation of the swingable lens retracting device 2 corresponding to the retraction or extension of the retractable lens 1 will be described in detail hereinafter with reference to FIGS. 4-7.

Figure 4:
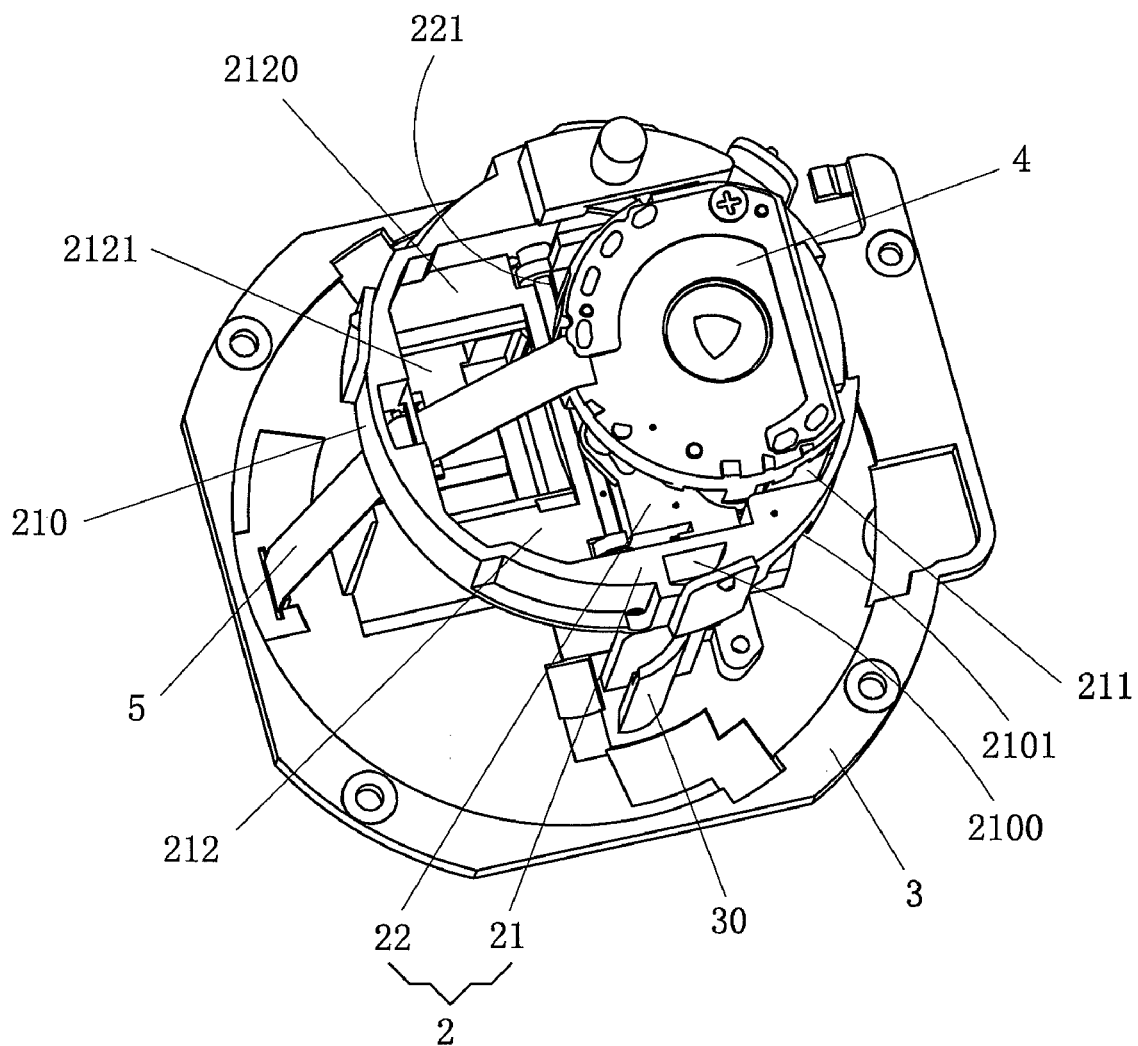
FIG. 4 is a perspective view illustrating the status of a swingable lens retracting device of the retractable lens when in the outwardly extended, operational state of the retractable lens.

In a preferred embodiment of the present invention, the swingable lens retracting device 2 is particularly adapted to but not limited to hold the second lens group L2. Referring to FIG. 4, the swingable lens retracting device 2 is composed of a second lens group moving frame 21 and a second lens group holding frame 22. The second lens group moving frame 21 moves forwards away from or backwards toward a CCD (Charge Couple Device) holder 3 corresponding to the extension or retraction movement of the retractable lens 1. The second lens group holding frame 22 is rotatably received in the second lens group moving frame 21. A shutter unit 4 is further provided on the second lens group holding frame 22. When the retractable lens 1 is in the outwardly extending, operational state, the shutter unit 4 is located between the first lens group L1 and the second lens group L2.

Figure 8:
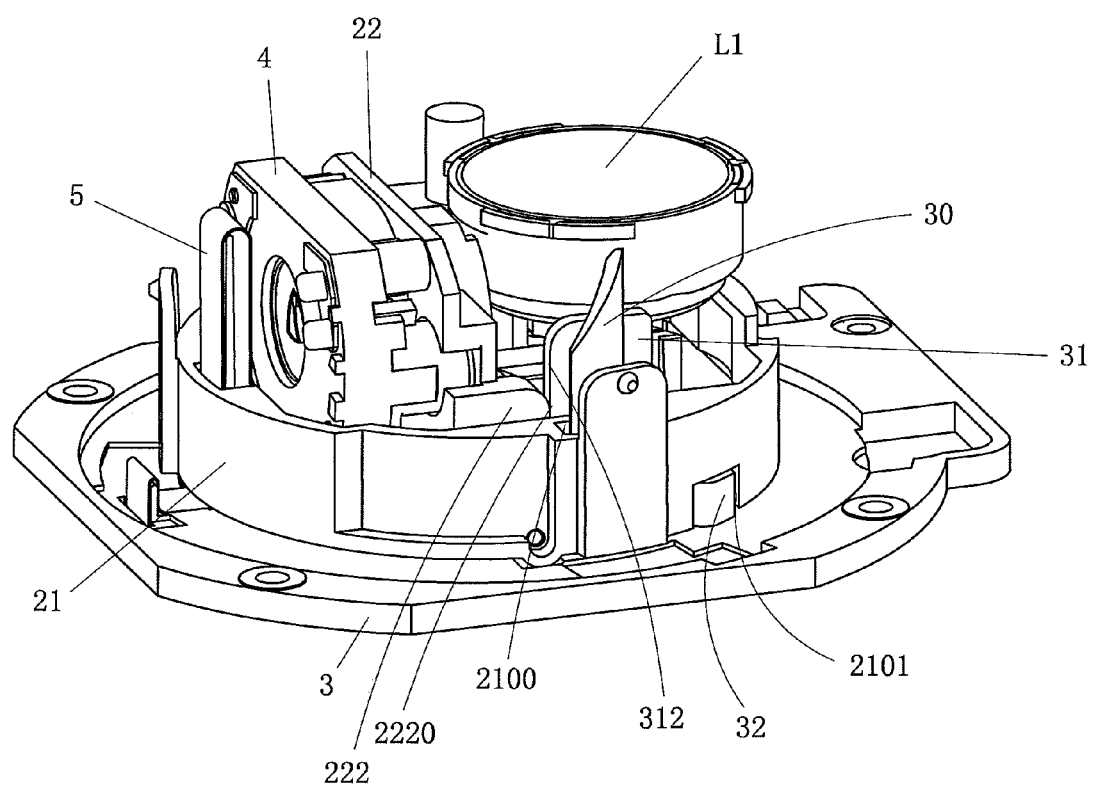
FIG. 8 is a perspective view showing the status of the present swingable lens retracting device when in the retracted state of the retractable lens as shown in FIG. 3, and the positional relationship between the present swingable lens retracting device and other optical elements of the retractable lens.

The second lens group moving frame 21, which has a ring shape, includes a rim 210, a first receiving portion 211 and a second receiving portion 212. When the second lens group holding frame 22 is in an operational state, as shown in FIG. 4, the first receiving portion 211 receives the second lens group holding frame 22 together with the shutter unit 4 therein. When the second lens group holding frame 22 is in a retracted state, as shown in FIG. 8, the second receiving portion 212 receives the second lens group holding frame 22 together with the shutter unit 4 therein. The second receiving portion 212 includes an abutment portion 2120 and an opening 2121. The rim 210 defines a through hole 2100 and a bottom cutout 2101. As shown in FIG. 4, when the retractable lens 1 is in the outwardly extending, operational state, a resilient PWB (Printed Wiring Board) 5, which projects from the CCD holder 3 for exposure control, forwardly extends through the opening 2121 of the second receiving portion 212 into electrical contact with the shutter unit 4. Accordingly, an electrical connection between a control circuit (not shown) and the shutter unit 4 can be established.

Figure 5:
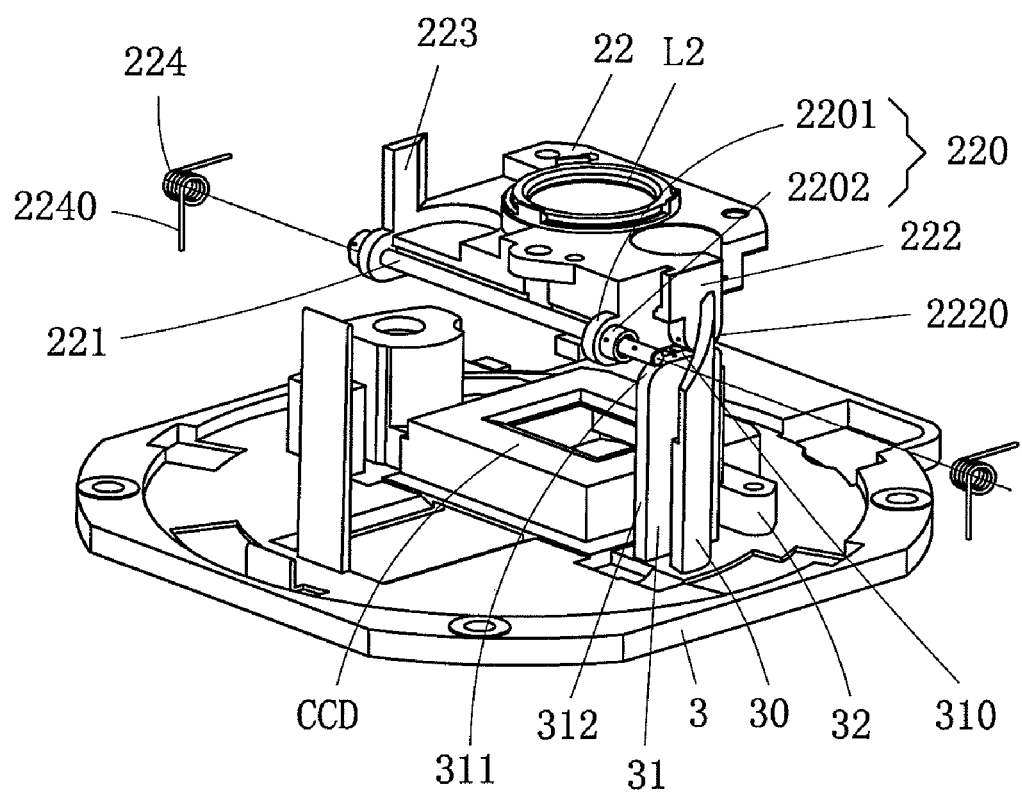
FIG. 5 is a perspective view illustrating the engagement between the present swingable lens retracting device and a CCD holder of the retractable lens.

Also referring to FIG. 5, the second lens group holding frame 22 has two mounting portions 220 for supporting opposite ends of a pivot shaft 221 that extends in a direction perpendicular to the common photographing optical axis Z0. The opposite ends of the pivot shaft 221 extend through the respective mounting portions 220 for being further received in corresponding pivot holes (not shown) defined in an inner side surface of the rim 210 of the second lens group moving frame 21. Accordingly, the second lens group holding frame 22 is swingably received in the second lens group moving frame 21. The second lens holding frame 22 and the second lens group L2 received therein are swingable about the pivot shaft 221 between an on-axis, photographing position as shown in FIG. 2 where the optical axis Z2 of the second lens group L2 coincides with the common photographing optical axis Z0 and an off-axis, radially retracted position (retracted away from the common photographing optical axis Z0) as shown in FIG. 3 where the optical axis Z2 of the second lens group L2 is orthogonal to the photographing optical axis Z0.

Each mounting portion 220 of the second lens group holding frame 22 consists of a large-sized abutment section 2201 and a small-sized sleeve section 2202. A torsion spring 224 is mounted on each sleeve section 2202, and is located between the abutment section 2201 of the second lens group holding frame 22 and the side surface of the rim 210 of the second lens group moving frame 21 to provide the resilient restoring force to restore the second lens group L2 from the radially retracted position as shown in FIG. 3 to the photographing position as shown in FIG. 2. An engagement portion 222 and an abutment member 223 are further formed on respective opposite ends of the second lens group holding frame 22 adjacent to the mounting portions 220. The engagement portion 222 has a bottom curved surface 2220.

The CCD holder 3 has a guide member 30 and a contact portion 31 both forwardly projecting from a front surface thereof. The guide member 30 is adapted to guide the forward and backward movements of the second lens group moving frame 21. The contact portion 31 is a planar member disposed proximate to the guide member 30, and has a front flat surface 310 for engagement with the curved surface 2220 of the engagement portion 222 of the second lens group holding frame 22. A protrusion 32 is further formed on the CCD holder 3 adjacent to the guide member 30 and the contact portion 31.

The operational process of the present swingable lens retracting device 2 will be described in detail hereinafter.

Figure 6:
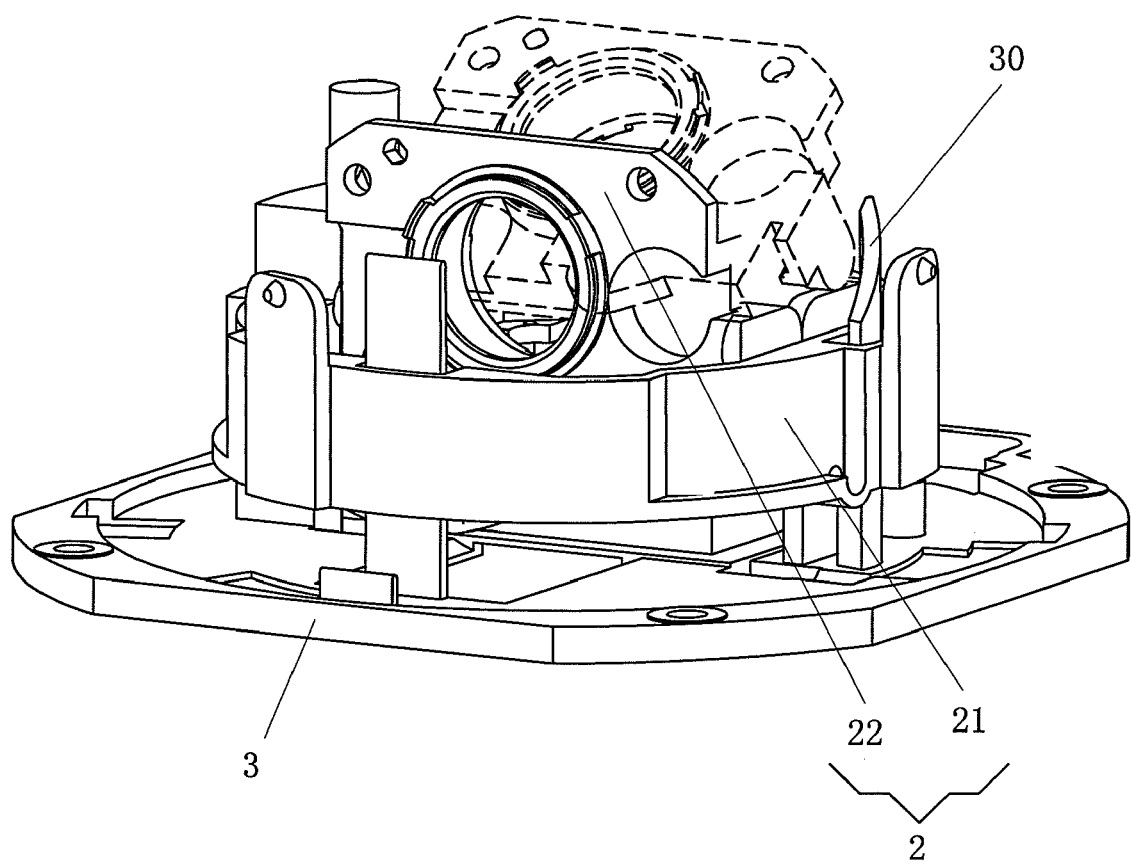
FIG. 6 is a schematic operational view of the present swingable lens retracting device.
Figure 7:
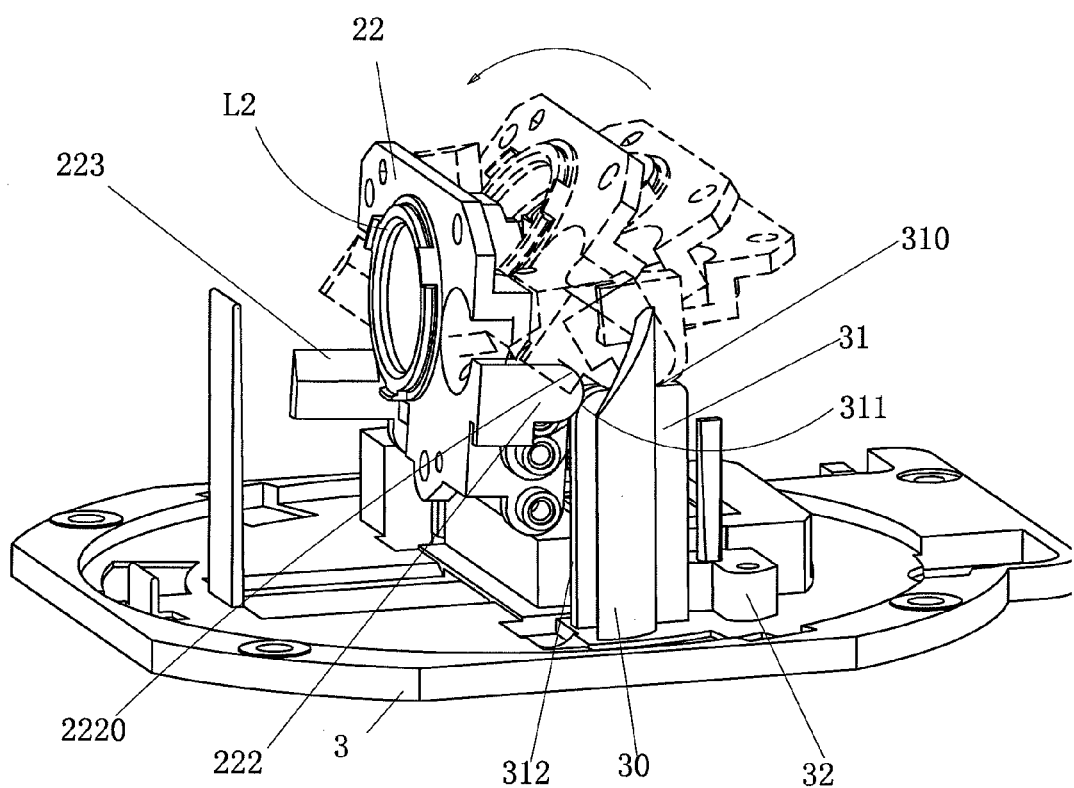
FIG. 7 is another schematic operational view of the present swingable lens retracting device with the second lens group moving frame thereof removed for clarification and simplicity.

When the retractable lens 1 is driven to extend forward from or retract backward into the camera body 6 as respectively shown in FIGS. 2 and 3, the second lens group moving frame 21 correspondingly moves forwards and backwards synchronously along the common photographing optical axis Z0. The second lens group holding frame 22 pivotally disposed in the second lens group moving frame 21 also moves forwards and backwards. Since the driving of the retractable lens 1 can be realized by conventional means and is not the inventive feature of the present invention, a detailed description thereof is thus eliminated herein. As shown in FIGS. 5-7, if the second lens group moving frame 21 moves rearward in a retracting direction to approach the CCD holder 3, the bottom curved surface 2220 of the engagement portion 222 of the second lens group holding frame 22 comes into contact with the front flat surface 310 of the contact portion 31 of the CCD holder 3. Accordingly, the second lens group holding frame 22 together with the shutter unit 4 is biased due to the component force in an anticlockwise direction away from the common photographing optical axis Z0 as indicated by the arrow in FIG. 7. In the biasing process, the bottom curved surface 2220 of the engagement portion 222 of the second lens group holding frame 22 sequentially comes into contact with the front flat surface 310 and the corner 311 of the contact portion 31 of the CCD holder 3 until the second lens group holding frame 22 is rotated to the radially retracted position as shown in FIG. 8. In this radially retracted position, the second lens group holding frame 22 is located in a plane parallel to the common photographing optical axis Z0, and the optical axis Z2 of the second lens group L2 received in the second lens group holding frame 22 is orthogonal to the common photographing optical axis Z0. The guide member 30 and the protrusion 32 of the CCD holder 3 are respectively received in the through hole 2100 of the rim 210 and the bottom cutout 2101 of the second lens group moving frame 21. The abutment member 223 of the second lens group holding frame 22 abuts against the inner bottom surface of the abutment portion 2120 of the second lens group moving frame 21, and the curved surface 2220 of the engagement portion 222 engages with the side surface 312 of the contact portion 31 of the CCD holder 3. Thus, the second lens group holding frame 22 and the shutter unit 4 are received in the second receiving portion 212 of the second lens group moving frame 21. In this radially retracted position, the two legs 2240 of each torsion spring 224 disposed on the pivot shaft 221 are forced to approach each other, whereby the second lens group holding frame 22 tends to restore to the original photographing position in a clockwise direction.

FIG. 3 clearly illustrates the status of the second lens group L2 when in the radially retracted position, and also the positional relationship between the second lens group L2 and other lens groups L1, L3. It can be seen that, in the fully retracted position, the retractable lens 1 is completely retracted into the camera body 6 with its front surface substantially flush with the front surface of the camera body 6. The second lens group L2 is retracted into a space radially outside the space in which the first and third lens groups L1 and L3 are retracted. In other words, the second lens group L2 is radially retracted into an axial range substantially identical to an axial range in the common photographing optical axis Z0 direction in which the first and third lens groups L1 and L3 are positioned. This swingable structure of the lens retracting device 2 for retracting the second lens group L2 in this manner reduces the length of the retractable lens 1 when the retractable lens 1 is fully retracted, thus making it possible to reduce the thickness of the camera body 6 in the common photographing optical axis Z0 direction, i.e., in the horizontal direction as viewed in FIG. 3. Further, this swingable structure of the lens retracting device 2 allows the optical axis Z2 of the second lens group L2 to be orthogonal to the common photographing optical axis Z0 in the fully retracted position. Therefore, in comparison with the conventional design of making the optical axis Z2 of the second lens group L2 to be parallel with the common photographing optical axis Z0 in the fully retracted position, the present design also allows the camera body 6 to be further reduced in height so as to accommodate the current miniaturization trend.

When the second lens group moving frame 21 is driven to advance to the operational state, that is, in the course of movement of the second lens group L2 from the off-axis, radially retracted position as shown in FIG. 3 to the on-axis, photographing position as shown in FIG. 2, the curved surface 2220 of the engagement portion 222 of the second lens holding frame 22 is gradually disengaged from the side surface 312 of the contact portion 31 of the CCD holder 3. At the same time, the two legs 2240 of the torsion springs 224 are consequently released to provide resilient restoring force so that the second lens holding frame 22 is enabled to return to its on-axis operational state as shown in FIGS. 2 and 4.

As can be understood from the foregoing, in the present embodiment of the retractable lens 1, the second lens group L2 is retracted to deviate from the common photographing optical axis Z0 with its optical axis Z2 being orthogonal to the common photographing optical axis Z0. At the same time, the second lens group L2 is retracted to an off-axis space radially outside the on-axis space in which the first and third lens groups L1 and L3 are positioned. This significantly reduces the length of the retractable lens 1 and thus the thickness of the camera body 6 in the fully retracted state. This also makes it possible to further reduce the height of the camera body 6 since the optical axis Z2 of the second lens group L2 is configured to be orthogonal to the common photographing optical axis Z0 in the fully retracted position. This arrangement sufficiently utilizes the existing vacant space of the camera body 6, whereby the configuration of the camera is made compact so as to accommodate miniaturization. Further, in comparison with the conventional design, the present swingable lens retracting device 2, which realizes the transition between an on-axis photographing position and an off-axis retracted position of a part of the lens elements of the retractable lens, is compact in configuration and easy in assembly while ensuring convenient operation.

It should be understood that the present invention is not limited solely to the particular embodiment described above. For instance, although the second lens group L2 serves as a retractable optical element which is to be rotated to the radially retracted position in the above illustrated embodiment, the retractable lens 1 can be modified so that any other lens group or optical element serves as the retractable optical element. Further, the present invention can be applied not only to a retractable zoom lens as described above, but also to a retractable fixed focal length lens wherein the lens barrel thereof respectively extends from and retracts into a camera body when in use and not in use. The lens or optical element retracting device according to the present invention can be incorporated in not only a digital camera as described above, but also in other optical devices.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retractable lens comprising a plurality of optical elements positioned on a common optical axis to constitute an optical system in an operational state of the retractable lens, one of the optical elements being retractable from the on-axis position on the common optical axis to an off-axis space radially outside the other optical elements when the retractable lens moves from the operational state to a retracted state, the retracting movement of said one optical element being independent of the other optical elements and the optical axis of said one optical element being orthogonal to the common optical axis in the retracted state, wherein said one optical element comprises a lens group retained in a holding frame, the holding frame is rotatably disposed in a moving frame via a pivot shaft extending in a direction perpendicular to the common optical axis, the moving frame is movable in the same direction as the retractable lens, the holding frame comprises an engagement portion located adjacent to one end of the pivot shaft, and the engagement portion has a curved surface for engaging with a flat surface of a CCD holder during the retracting movement of the retractable lens.

2. The retractable lens as claimed in claim 1, wherein each end of the pivot shaft has a torsion spring mounted thereon.

3. An optical device employing the retractable lens as claimed in claim 1.

4. A retractable lens movable between an operational state and a retracted state, the retractable lens comprising a first lens group, a second lens group and a third lens group constituting an optical system, and a second lens group retracting device, wherein all the lens groups are positioned on a common optical axis of the optical system when the retractable lens is in the operational state, and the second lens group is retracted to a space radially outside the common optical axis by the second lens group retracting device when the retractable lens moves from the operational state to the retracted state, the optical axis of the second lens group being orthogonal to the common optical axis in the retracted state, wherein the second lens group retracting device is a swingable retracting device comprising a second lens group moving frame and a second lens group holding frame rotatably received in the second lens group moving frame via a pivot shaft extending in a direction perpendicular to the common optical axis, the second lens group moving frame is movable in the same direction as the retractable lens, the second lens group holding frame comprises an engagement portion located adjacent to one end of the pivot shaft, and the engagement portion has a curved surface for engaging with a flat surface of a CCD holder during the retracting movement of the retractable lens.

5. The retractable lens as claimed in claim 4, wherein the second lens group is retracted into a space radially outside the space where the first and third lens groups are positioned, the second lens group being radially retracted into an axial range identical to an axial range in the common optical axis direction where the first and third lens groups are positioned.

6. The retractable lens as claimed in claim 4 further comprising a shutter unit disposed on the second lens group holding frame.

7. The retractable lens as claimed in claim 6, wherein the second lens group moving frame comprises a rim, and a first receiving portion and a second receiving portion for receiving the second lens group, the second lens group holding frame and the shutter unit therein when in their on-axis operational state and off-axis retracted state, respectively.

8. The retractable lens as claimed in claim 7, wherein the second lens group holding frame comprises an abutment member, the abutment member abutting against a bottom surface of the second receiving portion of the second lens group moving frame when the retractable lens is in the retracted state.

9. The retractable lens as claimed in claim 4, wherein each end of the pivot shaft has a torsion spring mounted thereon.

10. The retractable lens as claimed in claim 9, wherein each torsion spring is located between a mounting portion of the second lens group holding frame for mounting the pivot shaft and an inner side surface of the second lens group moving frame.

11. The retractable lens as claimed in claim 4, wherein the CCD holder has a forwardly projecting contact portion, and the flat surface is a front-end surface of the contact portion.

12. The retractable lens as claimed in claim 11, wherein the curved surface of the engagement portion of the second lens group holding frame is engaged with a side surface of the contact portion of the CCD holder when the retractable lens is in the retracted state.

13. The retractable lens as claimed in claim 11, wherein the CCD holder comprises a forwardly projecting guiding member for guiding the movement of the second lens group moving frame, the guiding member being received in a corresponding through hole of the second lens group moving frame when the retractable lens is in the retracted state.

* * * * *

UNITED STATES PATENT AND TRADEMARK OFFICE
CERTIFICATE OF CORRECTION

PATENT NO.       : 7,632,024 B2                                              Page 1 of 1
APPLICATION NO.  : 11/462614
DATED            : December 15, 2009
INVENTOR(S)      : Chun-hung Huang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 429 days.

Signed and Sealed this

Twenty-first Day of December, 2010

David J. Kappos
*Director of the United States Patent and Trademark Office*